United States Patent [19]

Yoshikawa

[11] Patent Number: 5,559,202
[45] Date of Patent: Sep. 24, 1996

[54] BOWL-SHAPE MICROPARTICLE AND PRODUCTION THEREOF

[75] Inventor: Hirofumi Yoshikawa, Yao, Japan

[73] Assignee: Matsumoto Yushi-Seiyaku Co., Ltd., Osaka, Japan

[21] Appl. No.: 466,422

[22] Filed: Jun. 6, 1995

Related U.S. Application Data

[63] Continuation of Ser. No. 182,038, filed as PCT/JP93/00662, May 20, 1993 published as WO93/23437, Nov. 25, 1993.

[30] Foreign Application Priority Data

May 20, 1992 [JP] Japan ..................................... 4-127260

[51] Int. Cl.$^6$ ........................................................ C06F 2/18
[52] U.S. Cl. ...................... 526/207; 526/303.1; 526/315; 526/319; 526/335; 526/342; 526/343; 526/344; 526/347; 526/347.1; 526/346; 526/930; 526/909
[58] Field of Search ..................... 526/707, 909, 526/930, 346, 347, 319

[56] References Cited

U.S. PATENT DOCUMENTS

| | | | |
|---|---|---|---|
| 4,743,507 | 5/1988 | Franses | 428/402 |
| 4,839,395 | 6/1989 | Masamizu | 521/56 |
| 4,973,632 | 11/1990 | Nagasuna | 526/200 |

FOREIGN PATENT DOCUMENTS

| | | |
|---|---|---|
| 50-155290 | 12/1975 | Japan. |
| 54-71130 | 6/1979 | Japan. |

*Primary Examiner*—Fred Zitomer
*Attorney, Agent, or Firm*—Foley & Lardner

[57] ABSTRACT

The present invention provides new non-spherical microparticles. The microparticles are a hemisphere or a half elliptic sphere having a big opening at the central portion, say bowl-shape microparticles, and a water uptake of from 80 to 140 ml/100 g, which can be produced by suspension polymerization of polymerizable monomers in the presence of crosslinking agents and hydrophobic liquids in water. The microparticle of the present invention has an excellent extending ability, adhesiveness and water uptake. The new bowl-shape microparticles having the big opening at the center can be easily produced according to the present invention, and the size and shape can be easily controlled.

5 Claims, 1 Drawing Sheet

BOWL-SHAPE MICROPARTICLE AND PRODUCTION THEREOF

This application is a continuation of application Ser. No. 08/182,038, filed as PCT/JP93/00662, May 20, 1993, published as WO93/23437, Nov. 25, 1993.

TECHNICAL FIELD

The present invention relates to a bowl-shaped microparticle and production thereof.

1. Background of the Art

Microparticles produced by a suspension polymerization of polymerizable monomers have been known, but they are all substantially spherical ones, and bowl-shaped microparticles have not been known at all.

Microparticles are as for adsorbents, release controlling agents, extenders and the like for perfumes, pharmaceuticals, agriculturals, cosmetics and so on, but the spherical microparticles have a deficiency such as low water uptake when used as the adsorbents. Japanese Patent Application KOKAI No. Sho 63-170437 discloses microparticles having numerous fine pores (say "microsponge") to improve the water uptake, but these microparticles are insufficient in the adhesiveness onto skin.

2. Disclosure of the Invention

The object of the present invention is to provide new non-spherical microparticles excellent in the extendibility and adhesiveness (e.g. onto skin) as well as water uptake. Microparticles having such properties improve, for instance, the adhesiveness onto skin, and the water uptake as maintaining the extendibility on the skin when compared to the conventional spherical microparticles.

The present invention relates to bowl-shape microparticles which are hemispherical or half ellipsoid spherical having a big opening at the center, and a water uptake of 80–140 ml/100 g, and the production thereof.

As a concrete examples the bowl-shape microparticles according to the present invention have a big opening at the center and a near hemisphere shape or a near half ellipsoidal sphere as illustrated in FIGS. 1 and 2, and ones of a half closed opening as illustrated in FIG. 2.

The microparticles of such shape have a water uptake of from 80 to 140 ml/100 g, which is much higher than that of spherical microparticles made of the same materials and of substantially the same average particle size, i.e. 40–80 ml/100 g.

The average diameter of the opening (the length of opening in the case of a half ellipsoidal sphere) of the microparticle of the present invention is preferably from 2 to 100 μm, more preferably from 3 to 50 μm. By controlling the opening diameter of the microparticles within this range an excellent an extendibility and an adhesiveness can be given thereon.

Polymerizable monomers usable in the present invention include, for example, styrene, methylstyrene, vinyltoluene, methacrylic esters, acrylic esters, vinyl acetate, acrylonitrile, vinyl chloride, vinylidene chloride, chloroprene, isoprene, butadiene, acrolein, acrylamide, allyl alcohol, vinyl pyridine, vinyl benzoate, allyl benzoate and the mixture thereof. As the ester residue of acrylic esters, methacrylic esters and the like one having the carbon numbers of 1–18 are preferable, and the carbon numbers of 1–4, especially methyl or ethyl ester is more preferable. Free acrylic acid or methacrylic acid may be copolymerized as a portion of monomers, and the obtained polymerized polymer can be crosslinked by the addition of polyvalent metallic compounds such as calcium, magnesium, zinc and the like, for instance, in the form of hydroxides.

The above monomers may be used singly or plurally to give a copolymer. Particularly copolymers obtained from plural monomers selected from styrene, methacrylic esters, acrylic esters, vinyl acetate, acrylonitrile and the like are preferable.

As a crosslinking agent divinylbenzene, ethylene dimethacrylate, triethylene glycol dimethacrylate, ethylene glycol dimethacrylate, 1,3-butylene dimethacrylate, allyl methacrylate, trimethylolpropane trimethacrylate and the like can be preferably used. Plural kinds of the crosslinking agent may be used.

These crosslinking agents are important for making the particles a bowl-shape. The necessary amount of the crosslinking agent to the polymerizable monomer is 0.1 to 30% by weight, more preferably 1 to 20% by weight. This amount of the crosslinking agent greatly influences the shape of the microparticle. As the amount of the crosslinking agent is less, the degree of deformation of the microparticle becomes lower, and the particles form sphere without deformation when the amount of the crosslinking agent is less than 0.1% by weight. Alternatively, excess amount of the crosslinking agent is not preferable, because a hydrophobic material encapsulated is liable to be removed.

The hydrophobic liquid applicable to the present invention should have a boiling point at 100° C. or higher, and a melting point at 0° C. or lower. The preferable solubility in water and viscosity of the hydrophobic liquid are 2 g/100 ml or less, and from 1 to 500 cps, respectively, though not critical.

The hydrophobic liquid includes hydrocarbons such as liquid paraffin, and isoparaffin; animal oils such as squalane, and mink oil; vegetable oils such as avocado oil, macadamia oil, and olive oil; esters such as diglyceride; ethers such as macromolecule polypropylene glycol, dibutyl ether, butyl cellosolve, anisole, and phenetole; and silicones, such as octamethylsiloxane, and silicone oils. Liquid paraffin, isoparffin, avocado oil, and silicone oil are most preferable.

The hydrophobic liquid is encapsulated in the polymer particles through the polymerization, when the polymer particles are deformed to the bowl-shape microparticles. If the shell layer is too thin, the obtained microparticles are easily crushed, and if too thick, they forms sphere without deformation. The thickness of the microparticles becomes thin when much amount of the hydrophobic liquid is used, so that the particles greatly deform, whereas the less amount of it, the thicker shell is obtained and the particles less deform. Preferable amount of the hydrophobic materials is 15 to 100 percent by weight based on the amount of the polymer, because less amount of the hydrophobic materials gives spherical particles. Within this range the amount of the hydrophobic liquid may be controlled according to the desired shape of the microparticles.

The amount of the hydrophobic materials greatly influences the shape of the microparticle. In case that the other conditions are the same, the less hydrophobic materials make the thicker shell of the bowl-shape microparticles, and the more the thinner. When much amount of the hydrophobic materials are used, the bowl becomes ellipsoidal. When the hydrophobic materials are used in the amount of about 15 to 25 percent by weight the shape of the microparticles becomes almost spherical bowl, and the amount exceeds about 25 percent by weight the particles gradually change to an ellipsoidal bowl shape. When more than 35 percent by weight, it makes the opening of the bowl almost close.

In the production of bowl-shape microparticles of the present invention one kind of in situ polymerization may be applied. That is, polymerizable monomers are polymerized by a suspension polymerization in water in the presence of a crosslinking agent, hydrophobic liquid and polymerization initiator as stirring to give microparticles encapsulating the hydrophobic liquid in a shell of the polymer.

The polymerization initiator includes radical catalyst such as benzoyl peroxide, methyl ethyl ketone peroxide, t-butyl peroxide, 2,2'-azobisisobutyronitrile, 2,2'-azobis(2,4-dimethyl)valeronitrile and the like.

Into the water medium a suspension stabilizer such as polyvinyl alcohol, gelatin, methyl cellulose, sodium alginate, calcium phosphate, colloidal silica, bentonite, aluminum oxide and the like may be added. In addition, aggregation inhibitors such as titanium oxide, calcium carbonate, barium sulfate, mica, talc, and magnesium carbonate, and the like may be used in order to prevent the aggregation of the microparticles at drying.

The polymerization may proceed at 50° to 95° C. in general.

The particle size can be controlled by stirring rate, and a preferable stirring rate is about 50 to 500 rpm, especially 100 to 300 rpm. The period required for the polymerization is from 3 to 24 hours and usually from 4 to 10 hours. These conditions are suitable for the production of microparticles of 2 to 100 μm.

The obtained microparticles are filtrated, and then dried at a temperature of lower than the softening temperature of the polymer, generally at 30° to 90° C.

THE BEST MODE OF THE PRESENT INVENTION

The present invention is illustrated in detail by the following Examples.

EXAMPLE 1

An oil phase and a water phase were prepared according to the following formulations:

| ingredients | parts by weight |
| --- | --- |
| OIL PHASE | |
| methyl methacrylate | 108 |
| ethylene glycol dimethacrylate | 12 |
| liquid paraffin | 30 |
| 2,2'-azobisbutyronitrile | 1 |
| WATER PHASE (pH 3.3: adjusted with $H_2SO_4$) | |
| deionized water | 300 |
| colloidal silica (solid 20%) | 15 |
| adipic acid-diethanolamine condensation products (concentration: 50%) | 1 |

Figure 1:
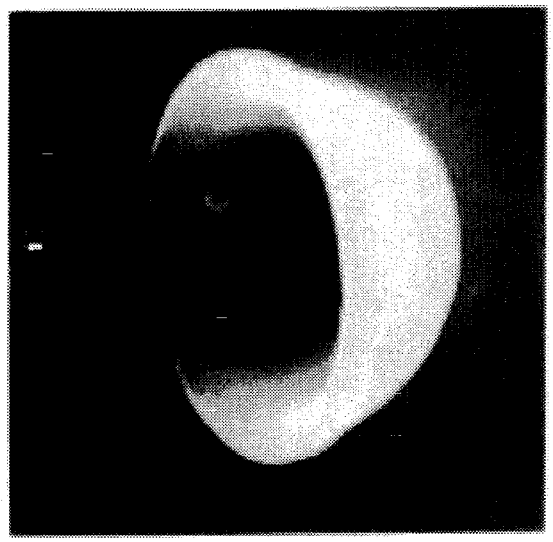
FIG. 1: SEM photograph of a bowl-shape microparticle of Example 1 of the present invention.

The above oil phase was dispersed into the water phase under a high speed revolution for 3 minutes using T. K. Homomixer made by Tokushu Kika Kogyo K.K. The obtained dispersion was charged into a 1.5 liter separable flask substituted with nitrogen gas, and polymerized at 65° C. for 5 hours under 200 rpm revolution. The reaction product was filtered to give a cake like product containing 28% water. This cake like product was dried at 80° C. for 5 hours to give white microparticle of an average diameter of 5 to 15 μm. The shape of microparticle was bowl-shape sphere. SEM photograph of the obtained microparticles is illustrated by FIG. 1.

The water uptake of the microparticles was 105 ml/100 g, higher than that of conventional microcapsules.

EXAMPLE 2

An oil phase was prepared according to the following formulation.

| OIL PHASE | |
| --- | --- |
| Ingredients | parts by weight |
| methyl methacrylate | 90 |
| ethylene glycol dimethacrylate | 10 |
| liquid paraffin | 50 |
| 2,2'-azobisisobutyronitrile | 0.6 |

Figure 2:
FIG. 2: SEM photograph of a bowl-shape microparticle of Example 2 of the present invention.

Microparticles were prepared using the above oil phase and the water phase of the Example 1 according to the same manner as the Example 1. The obtained microparticles were an average diameter of 5 to 15 μm, white, and elliptical bowl-shape. The SEM photograph of the particles is shown by FIG. 2.

The water uptake of the microparticles is very high, i.e. 120 ml/100 g.

COMPARATIVE EXAMPLE 1

An oil phase containing small amount of hydrophobic liquid was prepared according to the following formulation.

| OIL PHASE | |
| --- | --- |
| ingredients | parts by weight |
| methyl methacrylate | 90 |
| ethylene glycol dimethacrylate | 10 |
| liquid paraffin | 9 |
| 2,2'-azobisbutyronitrile | 0.6 |

Microparticles were prepared using the above oil phase and the water phase of the Example 1 according to the same manner as in the Example 1. The obtained microparticles had an average diameter of 10 μm and a spherical shape.

COMPARATIVE EXAMPLE 2

An oil phase containing no crosslinking agent was prepared according to the following formulation.

| OIL PHASE | |
| --- | --- |
| ingredients | parts by weight |
| methyl methacrylate | 90 |
| liquid paraffin | 50 |
| 2,2'-azobisbutyronitrile | 0.6 |

Microparticles were prepared using the above oil phase and the water phase of the Example 1 according to the same manner as in the Example 1. The obtained microparticles were a spherical particle having an average diameter of 10 µm.

THE POSSIBLE UTILITIES IN THE INDUSTRY

According to the present invention new bowl-shape microparticles having a big hollow at the center can be provided. The microparticles of the present invention are expected to be used for adsorbents, release controlling agents, extenders and the like for perfumes, pharmaceuticals, agriculturals, cosmetics and the like.

I claim:

1. A bowl-shaped crosslinked polymer microparticle of hemisphere or half elliptic sphere having a depression at the center, and a water uptake of from 80 to 140 ml/100 g, wherein the cross-linked polymer comprises at least one monomer selected from the group consisting of styrene, methylstyrene, vinyl toluene, methacrylic esters, acrylic esters, vinyl acetate, acrylonitrile, vinyl chloride, vinylidene chloride, chloroprene, isoprene, butadiene, acrolein, acrylamide, allyl alcohol, vinyl pyridine, vinyl benzoate, allyl benzoate, and combinations thereof, and wherein the cross-linked polymer is cross-linked with a cross-linking agent selected from the group consisting of divinylbenzene, ethylene dimethacrylate, triethylene glycol dimethacrylate, ethylene glycol dimethacrylate, 1,3-butylene dimethacrylate, allyl methacrylate, and trimethylolpropane trimethacrylate.

2. Bowl-shape crosslinked-polymer microparticles of claim 1, in which the average diameter of the opening is 2 to 100 µm.

3. A bowl-shape crosslinked-polymer microparticle according to claim 1 produced by suspension-polymerizing polymerizable monomers in the presence of a crosslinking agent and a hydrophobic liquid in water.

4. A bowl-shaped cross-linked polymer microparticle as claimed in claim 1 wherein said at least one monomer is selected from the group consisting of styrene, methacrylic esters, acrylic esters, vinyl acetate, acrylonitrile, and combinations thereof.

5. A bowl-shaped cross-linked polymer microparticle as claimed in claim 1 wherein the microparticle is prepared by suspension-polymerizing said at least one monomer in the presence of the cross-linking agent and a hydrophobic liquid in water.

* * * * *